(12) United States Patent
Aida et al.

(10) Patent No.: US 8,534,920 B2
(45) Date of Patent: Sep. 17, 2013

(54) ROLLING BEARING

(75) Inventors: Tomoyuki Aida, Nara (JP); Yuzuru Takahashi, Osaka (JP); Mikio Kuromatsu, Nara (JP); Takeshi Iwawaki, Nisshin (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 335 days.

(21) Appl. No.: 12/736,592

(22) PCT Filed: Apr. 22, 2009

(86) PCT No.: PCT/JP2009/057967
§ 371 (c)(1),
(2), (4) Date: Oct. 21, 2010

(87) PCT Pub. No.: WO2009/131139
PCT Pub. Date: Oct. 29, 2009

(65) Prior Publication Data
US 2011/0069920 A1    Mar. 24, 2011

(30) Foreign Application Priority Data

Apr. 22, 2008  (JP) ................ P2008-111495
Sep. 17, 2008  (JP) ................ P2008-238302
Mar. 6, 2009   (JP) ................ P2009-053730

(51) Int. Cl.
*F16C 19/00*  (2006.01)
*F16C 33/38*  (2006.01)

(52) U.S. Cl.
USPC .......................... 384/470; 384/523

(58) Field of Classification Search
USPC .................. 384/462–475, 523–534, 572–580
See application file for complete search history.

(56) References Cited

U.S. PATENT DOCUMENTS

| 4,797,014  | A | * | 1/1989  | Nicolich ............... 384/490 |
| 4,932,500  | A | * | 6/1990  | Smith et al. ........... 184/5.1 |
| 5,553,949  | A | * | 9/1996  | Fukuwaka et al. ...... 384/523 |
| 5,588,751  | A | * | 12/1996 | Nakata et al. ......... 384/463 |
| RE36,804   | E | * | 8/2000  | Kajihara et al. ....... 384/480 |

(Continued)

FOREIGN PATENT DOCUMENTS

DE  1892455 U  5/1964
DE  7638179 U1 6/1977

(Continued)

OTHER PUBLICATIONS

Machine Translation of JP 2002-147463.*

(Continued)

*Primary Examiner* — Alan Waits
(74) *Attorney, Agent, or Firm* — McGinn IP Law Group, PLLC

(57) ABSTRACT

A rolling bearing includes an outer ring, an inner ring, balls and a cage. The cage includes an annular portion which is disposed at the end portion in the axial direction thereof, and a plurality of pillar portions which protrude to the coaxial direction from the side surface on the one side in the axial direction of the annular portion and are arranged in the circumferential direction thereof so as to form therebetween pockets each for housing a rolling element, wherein a seal gap for restricting the flowing of lubricant is formed between the first annular portion and one of or both the outer ring and the inner ring not guiding the cage.

17 Claims, 16 Drawing Sheets

(56) References Cited

U.S. PATENT DOCUMENTS

| | | |
|---|---|---|
| 2004/0252925 A1* | 12/2004 | Gotoh .......................... 384/528 |
| 2005/0063627 A1 | 3/2005 | Ueda et al. |
| 2005/0220383 A1 | 10/2005 | Yokota et al. |

FOREIGN PATENT DOCUMENTS

| | | |
|---|---|---|
| JP | 55-10140 A | 1/1980 |
| JP | 5-34317 U | 5/1993 |
| JP | 5-96548 U | 12/1993 |
| JP | 9-250546 A | 9/1997 |
| JP | 2000-161365 A | 6/2000 |
| JP | 2001-336535 A | 12/2001 |
| JP | 2002-54450 A | 2/2002 |
| JP | 2002-147463 A | 5/2002 |
| JP | 2003-3856 A | 1/2003 |
| JP | 2003-232362 A | 8/2003 |
| JP | 2004-245231 A | 9/2004 |
| JP | 2005-90692 A | 4/2005 |
| JP | 2005-133818 A | 5/2005 |
| JP | 2005-180666 A | 7/2005 |
| JP | 2006-132622 A | 5/2006 |
| JP | 2006-322594 A | 11/2006 |
| JP | 2007-113592 A | 5/2007 |
| JP | 2007-198583 A | 8/2007 |
| JP | 2007-332995 A | 12/2007 |
| JP | 2008-51295 A | 3/2008 |

OTHER PUBLICATIONS

European Search Report dated Feb. 7, 2013.

* cited by examiner

ROLLING BEARING

TECHNICAL FIELD

The present invention relates to a rolling bearing including a cage.

BACKGROUND ART

In general, a cage is provided between an outer ring and an inner ring of a rolling bearing so that rolling elements are held with a predetermined interval along a circumferential direction thereof. For example, FIG. 9 is a sectional diagram showing a rolling bearing using a general cage having a crown shape. The cage 114 includes an annular portion 119 of an annular shape and a pillar portion 120 which protrudes toward the same direction from one side surface in the axial direction (left side) of the annular portion 119, whereby a housing space (pocket) 121 for housing a rolling element 117 between the pillar portions 120 adjacent to each other in the circumferential direction is formed. The pocket 121 is opened at the one end side (a side in opposite to the annular portion 119 side) in the axial direction of the cage 114. The cage 114 is configured to have an asymmetrical shape in the left and right direction with respect to the center in the axial direction of the rolling bearing 110.

Further, JP-A-2003-232362 discloses a technique in which many narrow grooves are formed on the inner peripheral surface and the outer peripheral surface of a crown-shaped cage along the circumferential direction thereof to thereby rectify the flow of peripheral lubricant to reduce fluid loss.

SUMMARY OF THE INVENTION

Problem to be Solved by the Invention

As shown in FIG. 9, when the rolling bearing 110 having the crown-shaped cage 114 is used under a condition of oil bath lubrication, the pillar portion 120 serves as a fan due to the rotation of the cage 114. Thus, lubricant is drawn into the bearing via gaps between outer and inner rings 112, 111 and the annular portion 119 as shown by arrows a. The lubricant drawn into the rolling bearing 110 is stirred by the pillar portion 120 within the rolling bearing 110 as shown by arrows b and then discharged. Thus, there arises a problem that the loss of bearing torque becomes large due to oil agitation loss caused by the stirring. Further, according to the technique of the patent document 1, although the lubricant can be flown smoothly in the circumferential direction between the inner and outer peripheral surfaces of the cage and the inner and outer rings, it is impossible to suppress the drawing of the lubricant into the rolling bearing.

Furthermore, JP-A-2007-113592 discloses a so-called outer-ring guide type in which a cage is configured by coupling a pair of divided members divided in the axial direction. This publication also discloses a configuration in which a guide surface formed on the inner peripheral surface of an outer ring and a guided surface formed on the outer peripheral surface of the cage are made in contact to each other via lubricant to thereby guide the rotation of the cage.

However, according to the rolling bearing having such the cage, when the rolling bearing is used under the condition of the oil bath lubrication, large gaps are generated between the inner peripheral surface of the cage and the both end portions in the axial direction of the outer peripheral surface of the inner ring not guiding the cage. Thus, there arises a problem that since excessive lubricant flows into the rolling bearing from the both gaps, the lubricant thus flown acts as rolling loss of the rolling element to thereby increase a bearing torque.

In view of the above-mentioned circumstances, an object of the present invention is to provide a rolling bearing which can suppress drawing of lubricant into the rolling bearing to thereby reduce the oil agitation loss of the lubricant within the rolling bearing.

Means for Solving the Problem

According to the invention, a rolling bearing comprises: an outer ring; an inner ring; a plurality of rolling elements rotatably provided between the outer ring and the inner ring; and a cage which holds the plurality of rolling elements with a predetermined interval in a circumferential direction thereof and of which rotation is guided by the outer ring, the inner ring or the rolling elements, wherein the cage comprises a first annular portion which is disposed at an end portion in an axial direction, and a plurality of pillar portions which protrude in a coaxial direction from a side surface of the first annular portion on one side thereof in the axial direction and which are arranged in the circumferential direction so as to form pockets defined between the pillar portions and configured to house the rolling elements, respectively, and wherein a seal gap for restricting a flowing of lubricant is formed between the first annular portion and one of or both the outer ring and the inner ring which do not guide the cage.

According to this configuration, for example, when the outer ring is a bearing ring (guide bearing ring) for guiding the cage, the seal gap is formed between the first annular portion of the cage and the inner ring which is the bearing ring not for guiding the cage (non-guide bearing ring). In contrast, when the inner ring is the guide bearing ring, the seal gap is formed between the first annular portion and the outer ring which is the non-guide bearing ring. Further, when the cage is guided by the rolling elements, each of the outer ring and the inner ring serves as the non-guide bearing ring, and the seal gaps are formed between the first annular portion and these non-guide bearing rings. According to the seal gap, the flowing of the lubricant between the first annular portion and the non-guide bearing ring is restricted, whereby the drawing of the lubricant into the rolling bearing can be suppressed.

On the other hand, when the outer ring or the inner ring is the guide bearing ring, only a narrow guide gap is formed between the guide bearing ring and the cage. Thus, since the flowing of the lubricant is restricted by the guide gap, the drawing of the lubricant into the rolling bearing from the guide gap can be suppressed.

In the above-mentioned configuration, in a side surface of the first annular portion on the other side thereof in the axial direction, at least a radial outside portion thereof may have an inclined surface which inclines gradually closer to the other side in the axial direction toward an outside in a radial direction.

According to the configuration, due to the inclined side surface, the lubricant existing near the side surface of the first annular portion on the other side thereof in the axial direction is introduced in a direction (see an arrow A in FIG. 1) away from the first annular portion while flowing toward the outside in the radial direction due to the centrifugal force according to the rotation of the cage. Thus, the lubricant can be suppressed from being drawn into the rolling bearing from the gap between the first annular portion and the outer ring.

Further, according to this invention, an inner peripheral surface at an end portion of the outer ring on the other side in the axial direction is preferably formed to have an inclined surface which inclines gradually closer to the outside in the radial direction toward the other side in the axial direction from the one side in the axial direction. Thus, since the lubricant flowing to the outside in the radial direction from the side surface of the first annular portion on the other side in the axial direction can be further introduced to the other side in the axial direction by the inclined surface of the outer ring, the lubricant can be further suppressed from being drawn into the rolling bearing.

In the above-mentioned configuration, an inner peripheral surface of the pillar portion is recommended to be formed to have an inclined surface which inclines gradually closer to an outside in a radial direction toward the one side in the axial direction from the other side in the axial direction. According to the inclined inner peripheral surface of the pillar portion, the lubricant drawn into the rolling bearing can be positively introduced to the one side in the axial direction and then discharged to the outside of the rolling bearing.

In the above-mentioned configuration, preferably, one of the bearing rings of the outer ring and the inner ring guides the cage. In this case, since only the narrow guide gap is formed between the guide bearing ring and the cage, the flowing of the lubricant is restricted by the guide gap and the drawing of the lubricant into the rolling bearing from the guide gap can be suppressed.

In particular, it is preferable that the outer ring guides the cage, whereby the drawing of the lubricant into the rolling bearing can be further suppressed as compared with the case where the inner bearing ring guides the cage.

In the above-mentioned configuration, the cage may further include a second annular portion which is disposed at an end portion on an opposite side to the first annular portion in the axial direction, wherein the plurality of pillar portions may be formed so as to bridge between the first annular portion and the second annular portion. In this case, in an outer side surface in the axial direction of each of the first and second annular portions, at least a radial outside portion thereof may be formed to have an inclined surface which inclines gradually closer to the other side in the axial direction toward an outside in a radial direction. According to this configuration, the lubricant existing near the outside surface in the axial direction of each of the annular portions is introduced in a direction away from the each of the annular portions along the inclined side surface while flowing toward the outside in the radial direction due to the centrifugal force according to the rotation of the cage. Thus, the lubricant can be more effectively suppressed from being flown into the rolling bearing from the gap between each of the annular portions and the outer ring.

Advantages of the Invention

According to the invention, the lubricant can be suppressed from being drawn into the rolling bearing and the oil agitation loss of the lubricant within the rolling bearing can be reduced.

MODE FOR CARRYING OUT THE INVENTION

Figure 1:
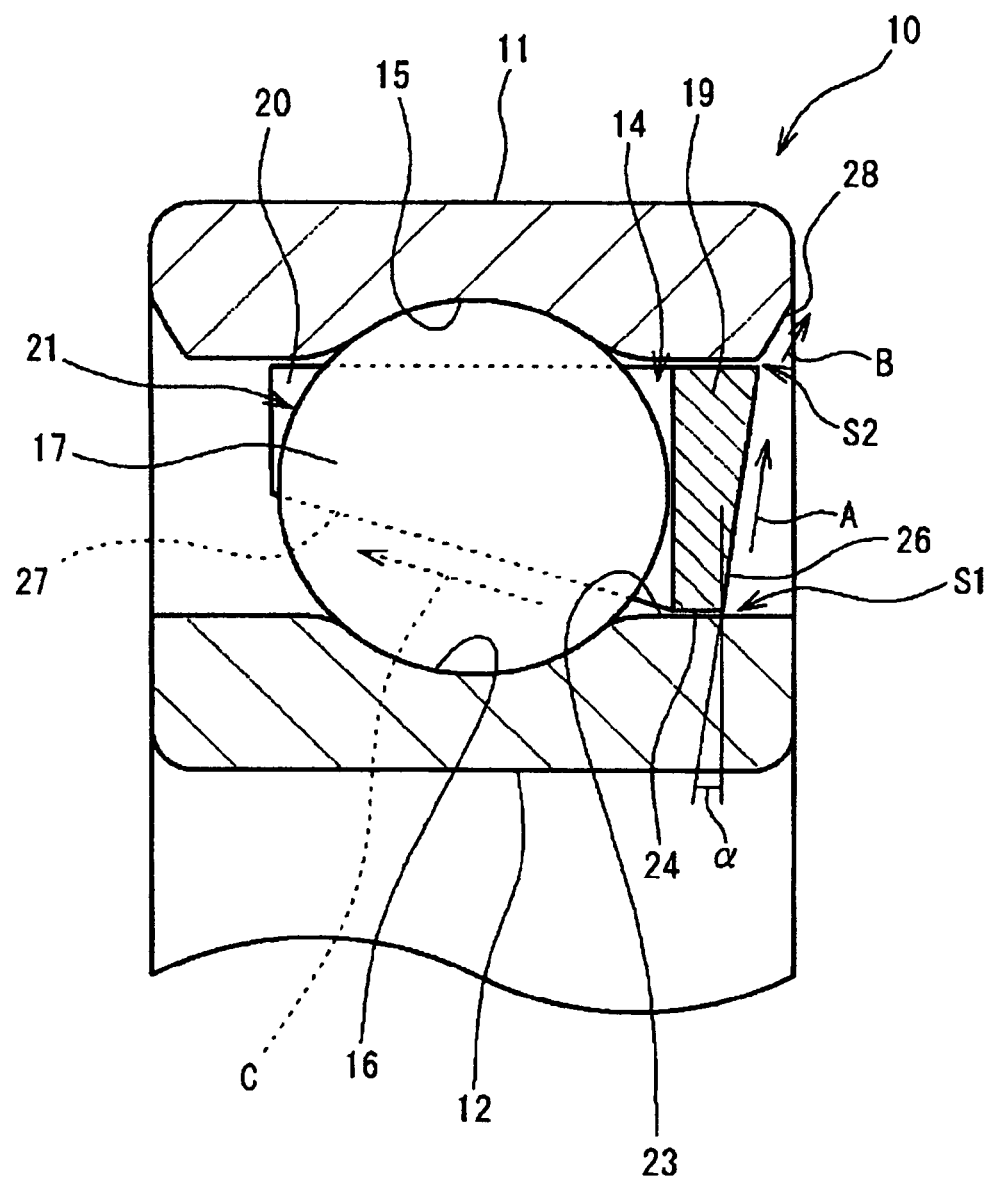
FIG. 1 is a sectional diagram of a rolling bearing according to the first embodiment of the invention.
Figure 2:
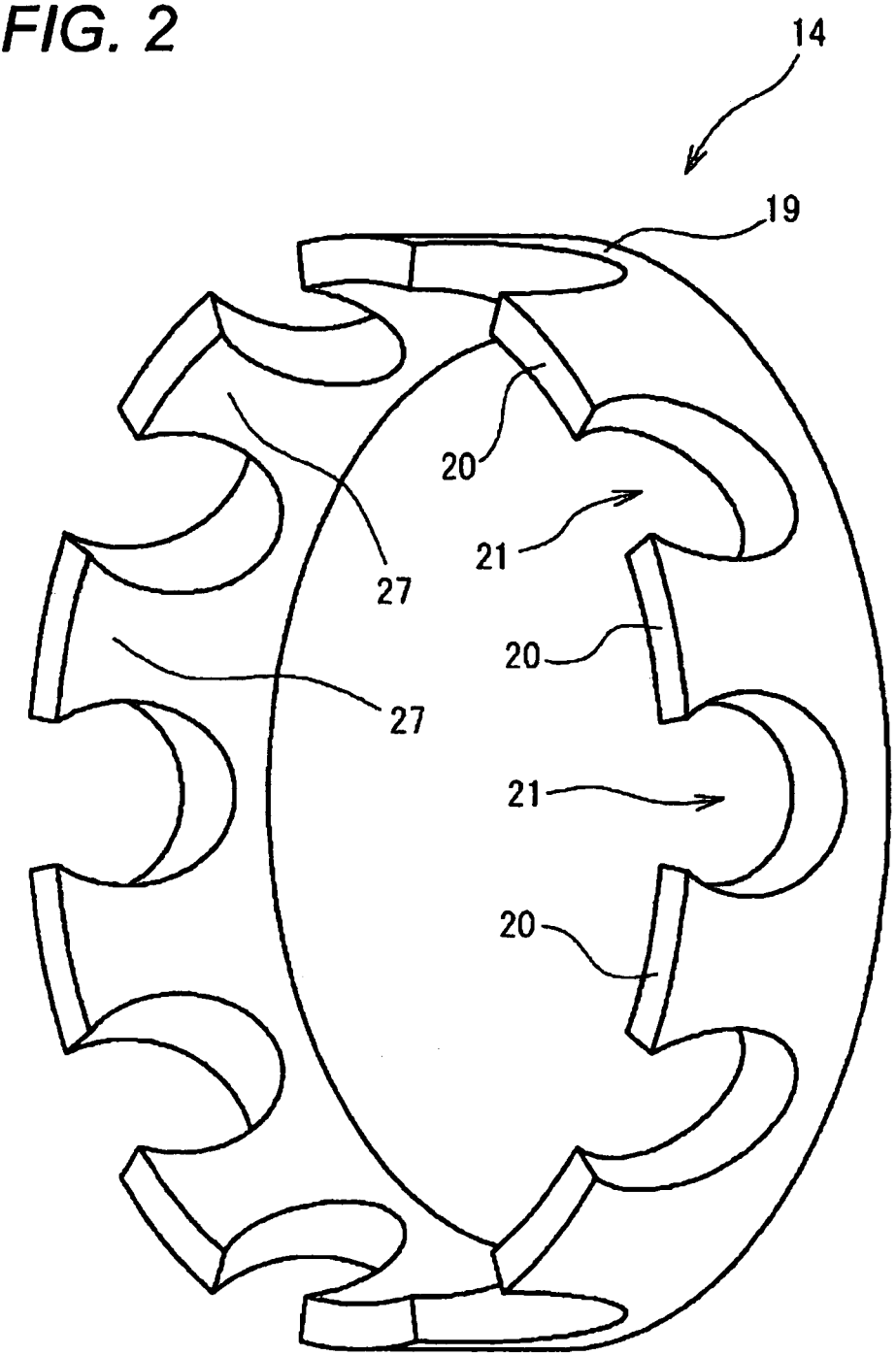
FIG. 2 is a perspective view showing a cage used in the rolling bearing shown in FIG. 1.

FIG. 1 is a sectional diagram showing a rolling bearing according to the first embodiment of the invention, and FIG. 2 is a perspective view showing a cage used for the rolling bearing. The rolling bearing 10 includes an outer ring 11, an inner ring 12, rolling elements 17 and a cage 14. The outer ring 11 and the inner ring 12 are disposed so as to oppose to each other in the radial direction. An outer-ring raceway surface 15 of a concave curved shape is formed at the inner peripheral surface of the outer ring 11 and an inner-ring raceway surface 16 of a concave curved shape is formed at the outer peripheral surface of the inner ring 12. A plurality of balls 17 as the rolling elements are disposed so as to be rotatable between the outer-ring raceway surface 15 and the inner-ring raceway surface 16. Each of the outer ring 11, the inner ring 12 and the balls 17 is formed by metal such as bearing steel, and the cage 14 is formed by composite resin or metal, for example.

The cage 14 includes an annular portion 19 of an annular shape (first annular portion) and a plurality of pillar portions 20 which protrude from one side surface in the axial direction (left side) of the annular portion 19 toward the same direction (left direction). The plurality of pillar portions 20 are provided along the circumferential direction so as to have an interval therebetween. A pocket (housing space) 21 for housing the ball 17 is formed between the adjacent pillar portions 20. The pocket 21 is formed so as to surround more than the half of the entire circumferential periphery of the ball 17.

The cage 14 is formed as a so-called inner-ring guide type, wherein a guide surface 23 for guiding the cage 14 is formed at the outer peripheral surface of the inner ring 12, a guided surface 24 is formed at the inner peripheral surface of the annular portion 19 of the cage 14, and a fine guide gap S1 is formed between the guide surface 23 and the guided surface 24. The cage 14 is configured in a manner that the cage is guided by the inner ring 12 due to the mutual contact of the guide surface 23 and the guided surface 24 via the lubricant, whereby the cage can be rotated smoothly. The size of the guide gap S1 is set to be about 0.15 mm (radius value), for example.

A seal gap S2 is formed between the outer peripheral surface of the annular portion 19 of the cage 14 and the inner peripheral surface of the outer ring 11. The seal gap S2 is larger than the guide gap S1. However, the seal gap can restrict the flow of the lubricant between the outer peripheral surface of the annular portion 19 and the inner peripheral surface of the outer ring 11 and is set to be about 0.4 mm (radius value), for example.

The side surface of the other side (right side) in the axial direction of the annular portion 19 of the cage 14 is formed as an inclined surface 26 which gradually inclines closer to the right side toward an outside in the radial direction. Due to the inclined surface 26, the size (thickness) in the axial direction at the outer end portion in the radial direction of the annular portion 19 is larger than the size in the axial direction at the inner end portion in the radial direction thereof. Further, the inner peripheral surface of the pillar portion 20 is formed as an inclined surface 27 which gradually inclines closer to the outside in the radial direction toward the left side from the right side.

The right end portion of the inner peripheral surface of the outer ring 11 is formed as an inclined surface 28 which gradually inclines closer to the outside in the radial direction toward the right side from the left side. The position in the axial direction of the left end portion of the inclined surface 28 almost coincides with that of the outer end portion in the radial direction of the inclined surface 26 of the annular portion 19. Thus, the inclined surface 26 of the right side surface of the annular portion 19 almost continues to the inclined surface 28 of the inner peripheral surface of the outer ring 11.

The explanation will be made as to a case where the rolling bearing 10 as configured in the above-mentioned manner is used under the condition of oil bath lubrication. In the case of using the outer ring 11 as a fixed ring and the inner ring 12 as a rolling ring, when the cage 14 rotates together with the inner ring 12, the pillar portion 20 serves as a fan to thereby tend to draw the lubricant from the gaps S1, S2 between the annular portion 19 and the inner and outer rings 12, 11. However, according to the rolling bearing 10 of this embodiment, since the gap between the outer ring 11 and the annular portion 19 is formed as the seal gap S2, the flow of the lubricant through the seal gap S2 is restricted. Also, since the gap between the inner ring 12 and the annular portion 19 is formed as the guide gap S1, the flow of the lubricant through the guide gap S1 is also restricted. Thus, since the drawing of the lubricant into the rolling bearing 10 from the respective gaps S1, S2 is suppressed, the oil agitation loss of the lubricant within the rolling bearing 10 can be reduced. As a result, the loss of the bearing torque due to the oil agitation loss can be reduced.

Further, due to the inclined surface 26 of the cage 14, since the lubricant existing near the inclined surface 26 is introduced in the right direction (see an arrow A) while flowing toward the outside in the radial direction due to the centrifugal force according to the rotation of the cage 14, the lubricant can be suppressed from being drawn into the rolling bearing 10 from the seal gap S2 provided between the outer ring 11 and the annular portion 19. Furthermore, due to the inclined surface 28 of the outer ring 11, since the lubricant can be further introduced to the outside in the radial direction and the right direction (see an arrow B), the lubricant can be further suppressed from being drawn into the rolling bearing 10 from the seal gap S2 provided between the outer ring 11 and the annular portion 19.

Since the annular portion 19 of the cage 14 is formed in a manner that the size (thickness) in the axial direction at the outer end portion in the radial direction is larger than that at the inner end portion in the radial direction, the seal gap S2 between the outer ring 11 and the annular portion 19 can be made as long as possible in the axial direction, whereby it becomes possible to enhance the sealing property.

Further, since the inner peripheral surface of the pillar portion 20 is formed as the inclined surface 27, even if the lubricant is drawn into the rolling bearing 10 from the respective gaps S1, S2, since the lubricant within the rolling bearing 10 is introduced to the left direction along the inclined surface 27 in accordance with the rotation of the cage 14, the discharge of the lubricant to the outside of the rolling bearing 10 is promoted (see an arrow C).

Figure 3:
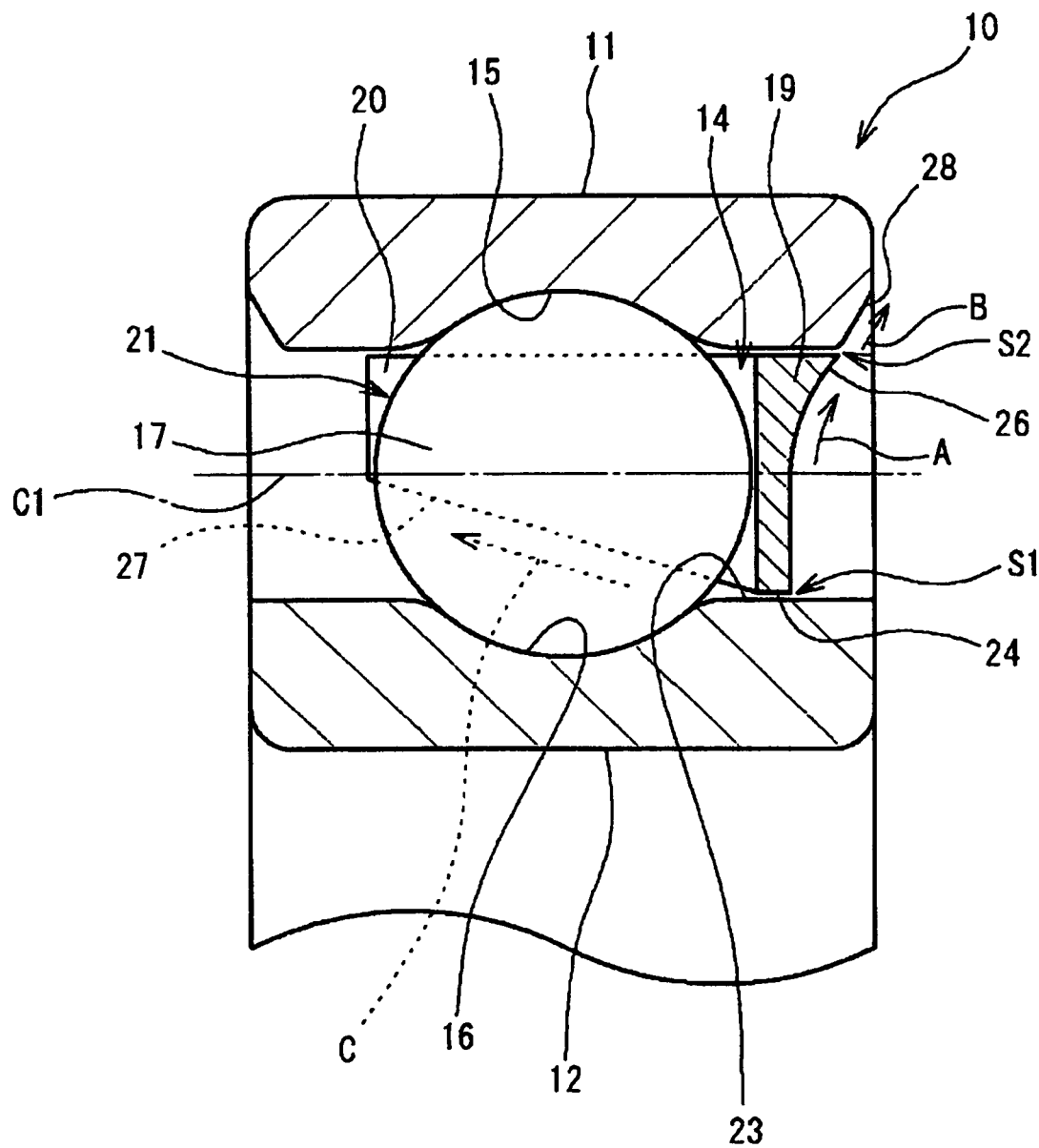
FIG. 3 is a sectional diagram of a rolling bearing according to the second embodiment of the invention.

FIG. 3 is a sectional diagram showing a rolling bearing according to the second embodiment of the invention. According to this embodiment, the outside portion in the radial direction of the right side surface of the annular portion 19 of a cage 14 is formed as an inclined surface 26. To be more concrete, a range from the center C1 in the radial direction of the annular portion 19 to the outer end in the radial direction thereof is formed as the inclined surface 26, whilst a range from the center C1 in the radial direction thereof to the inner end in the radial direction thereof is formed as a flat surface along the radial direction. Further, the inclined surface 26 is formed in a concave curved shape.

Also in this embodiment, the function and effects similar to those of the first embodiment can be attained. Further, since the inclined surface 26 is formed as the concave curved shape, the lubricant can be furthermore introduced to the right direction, so that the drawing of the lubricant into the rolling bearing 10 from the seal gap S2 can be furthermore suppressed. Since the other configuration is same as the first embodiment, the detailed explanation thereof will be omitted.

Figure 4:
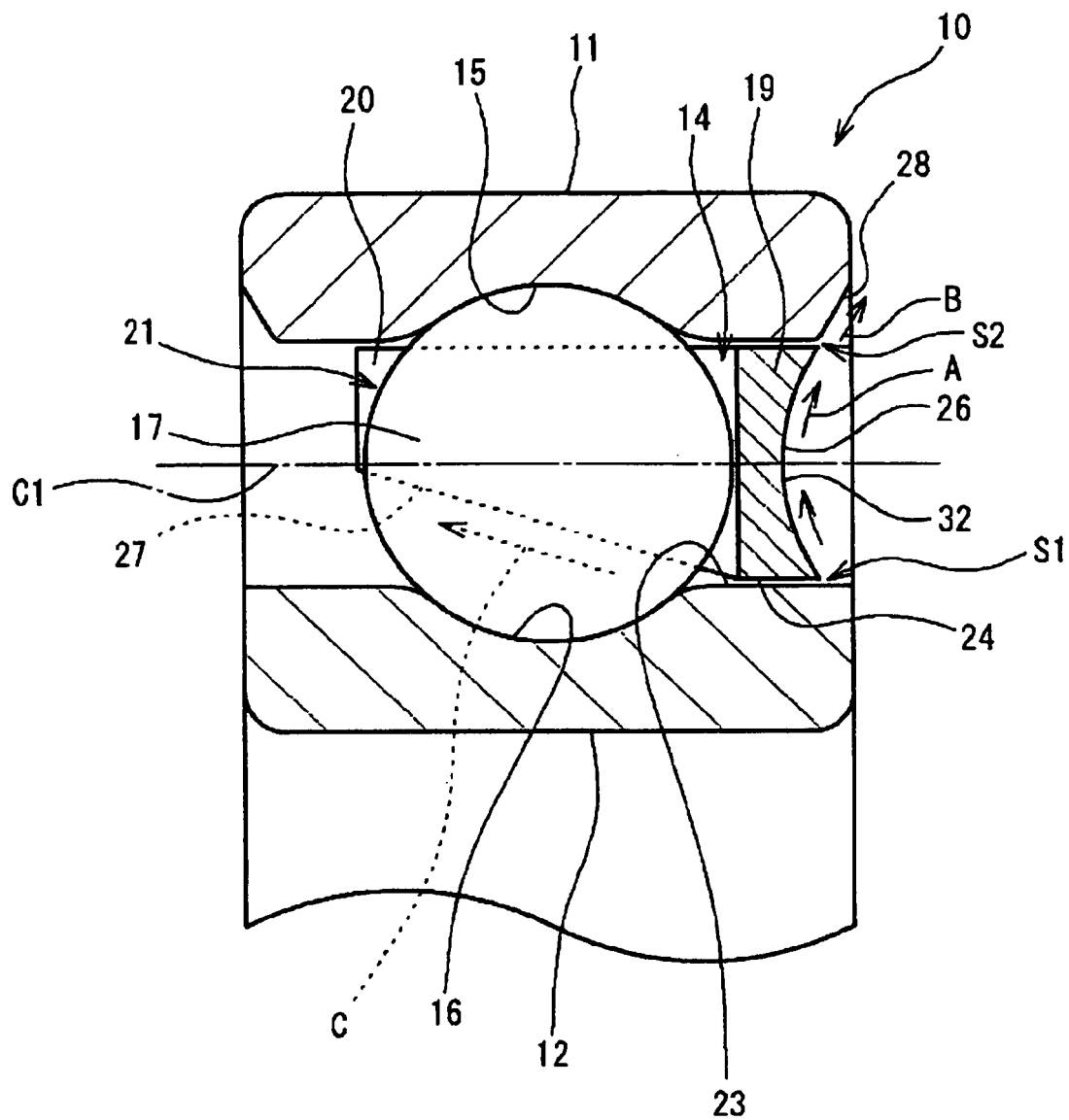
FIG. 4 is a sectional diagram of a rolling bearing according to the third embodiment of the invention.

FIG. 4 is a sectional diagram showing a rolling bearing according to the third embodiment of the invention. According to this embodiment, as to the right side surface of the annular portion 19 of a cage 14, a range from a center C1 in the radial direction thereof to the outer end in the radial direction thereof is formed as a inclined surface 26, whilst a range from the center C1 in the radial direction thereof to the inner end in the radial direction thereof is formed as an inclined surface 32 which inclination direction is in opposite to that of the inclined surface 26. Further, the inclined surface 26 and the inclined surface 32 form a continuous concave curved surface.

According to this embodiment, the inclined surface 26 of the annular portion 19 has effects and advantages similar to the second embodiment. Further, since the inclined surface 32 is formed, the size in the axial direction at the inner end portion in the radial direction of the annular portion 19 becomes large as well as the outer end portion in the radial direction thereof. Thus, since the guide gap S1 between the inner ring 12 and the annular portion 19 is made long in the axial direction, the sealing property can be enhanced.

Figure 5:
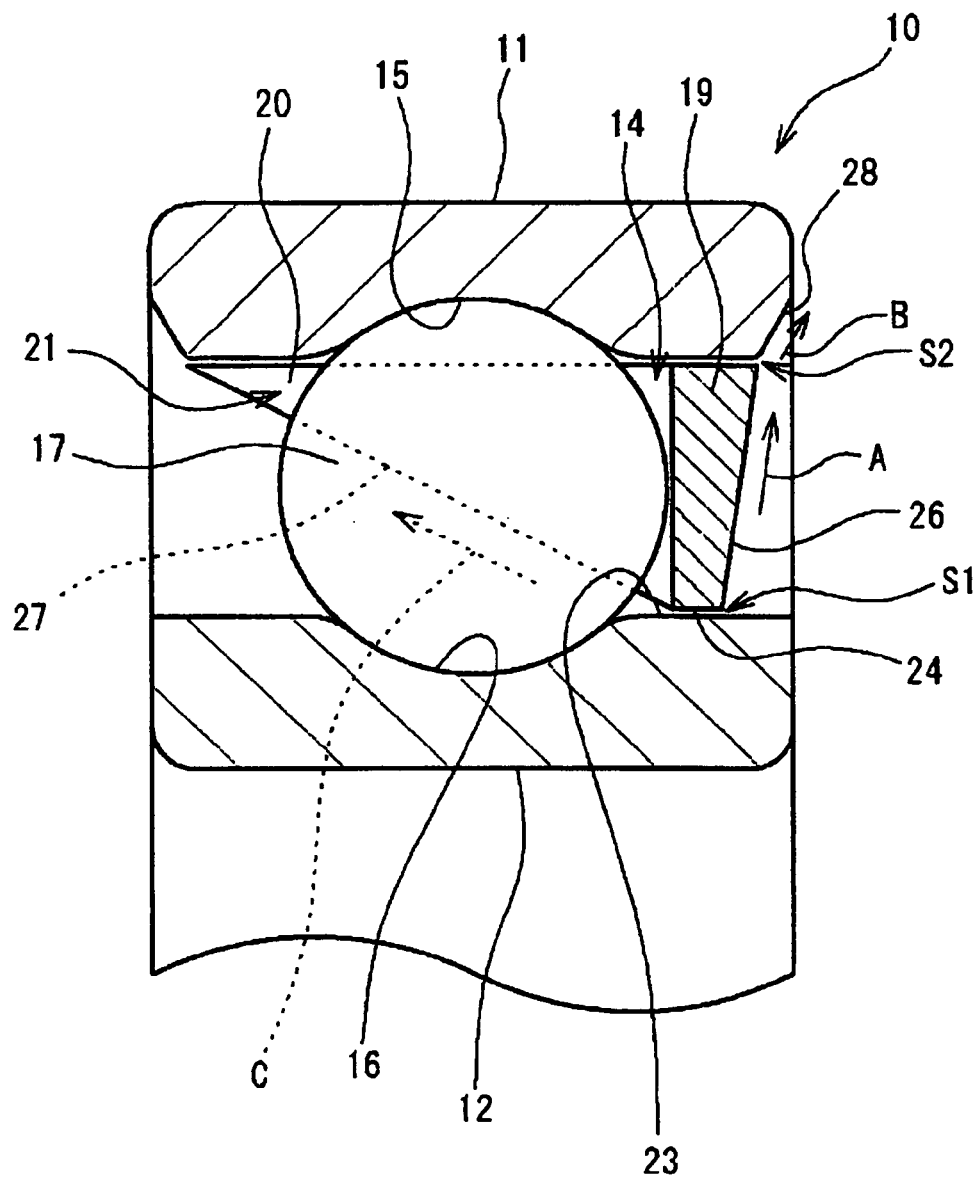
FIG. 5 is a sectional diagram of a rolling bearing according to the fourth embodiment of the invention.

FIG. 5 is a sectional diagram showing a rolling bearing according to the fourth embodiment of the invention. According to this embodiment, an inclined surface 27 at the inner peripheral surface of a cage 14 is formed to have an inclination angle larger than that of the inclined surface 27 of the first embodiment (see FIG. 2), whereby the left end portion of the cage 14 is formed in a sharp shape. Thus, according to this embodiment, the discharge function of the lubricant due to the inclined surface 27 is furthermore enhanced. The inclined surface 27 of this embodiment may also be applied to the cage 14 of each of the second and third embodiments (see FIGS. 3 and 4).

Figure 6:
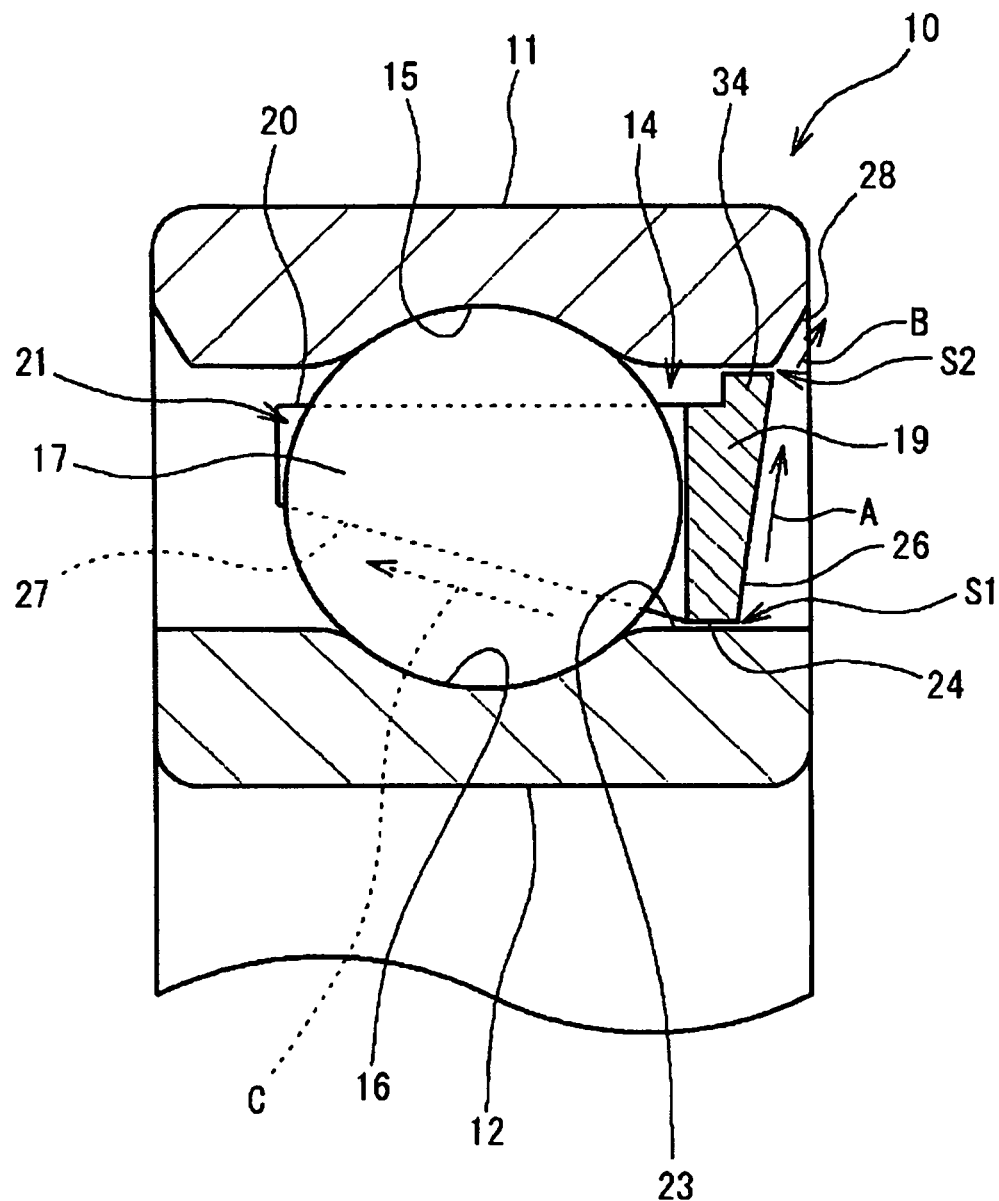
FIG. 6 is a sectional diagram of a rolling bearing according to the fifth embodiment of the invention.

FIG. 6 is a sectional diagram showing a rolling bearing according to the fifth embodiment of the invention. According to this embodiment, a projection 34 protruding in the radial outside direction is formed at the outer circumferential surface of an annular portion 19 along the entire periphery thereof. A seal gap S2 is formed between the tip end surface of the projection 34 and the inner peripheral surface of an outer ring 11. Also in this embodiment, the function and effects similar to those of the first embodiment can be attained. Further, according to this embodiment, since the volume of a cage 14 is smaller as compared with those of the first to fourth embodiments, the weight and an amount of the material of the cage 14 can be reduced.

Figure 7:
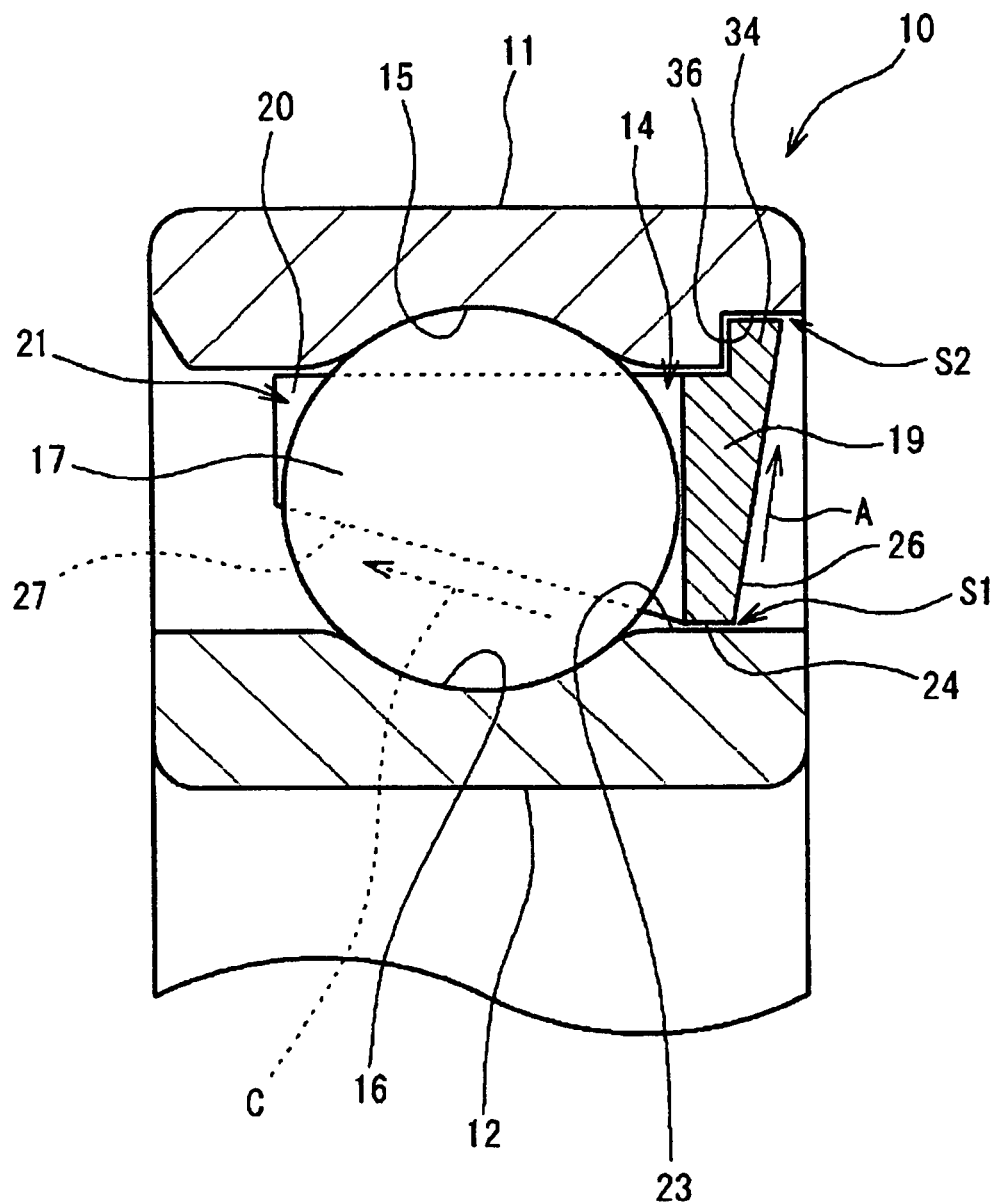
FIG. 7 is a sectional diagram of a rolling bearing according to the sixth embodiment of the invention.

FIG. 7 is a sectional diagram showing a rolling bearing according to the sixth embodiment of the invention. According to this embodiment, a projection 34 protruding in the radial outside direction is formed at the outer circumferential surface of an annular portion 19 along the entire periphery thereof and a step portion 36 for entering the projection 34 therein is formed at the right end portion of the inner circumferential surface of an outer ring 11. A seal gap S2 (labyrinth gap) bent in an L-character shape is formed between the step portion 36 and the projection 34. Thus, according to this embodiment, since the sealing performance due to the seal gap S2 is further enhanced, the drawing of the lubricant into the rolling bearing 10 from the seal gap S2 can be further suppressed.

Figure 8:
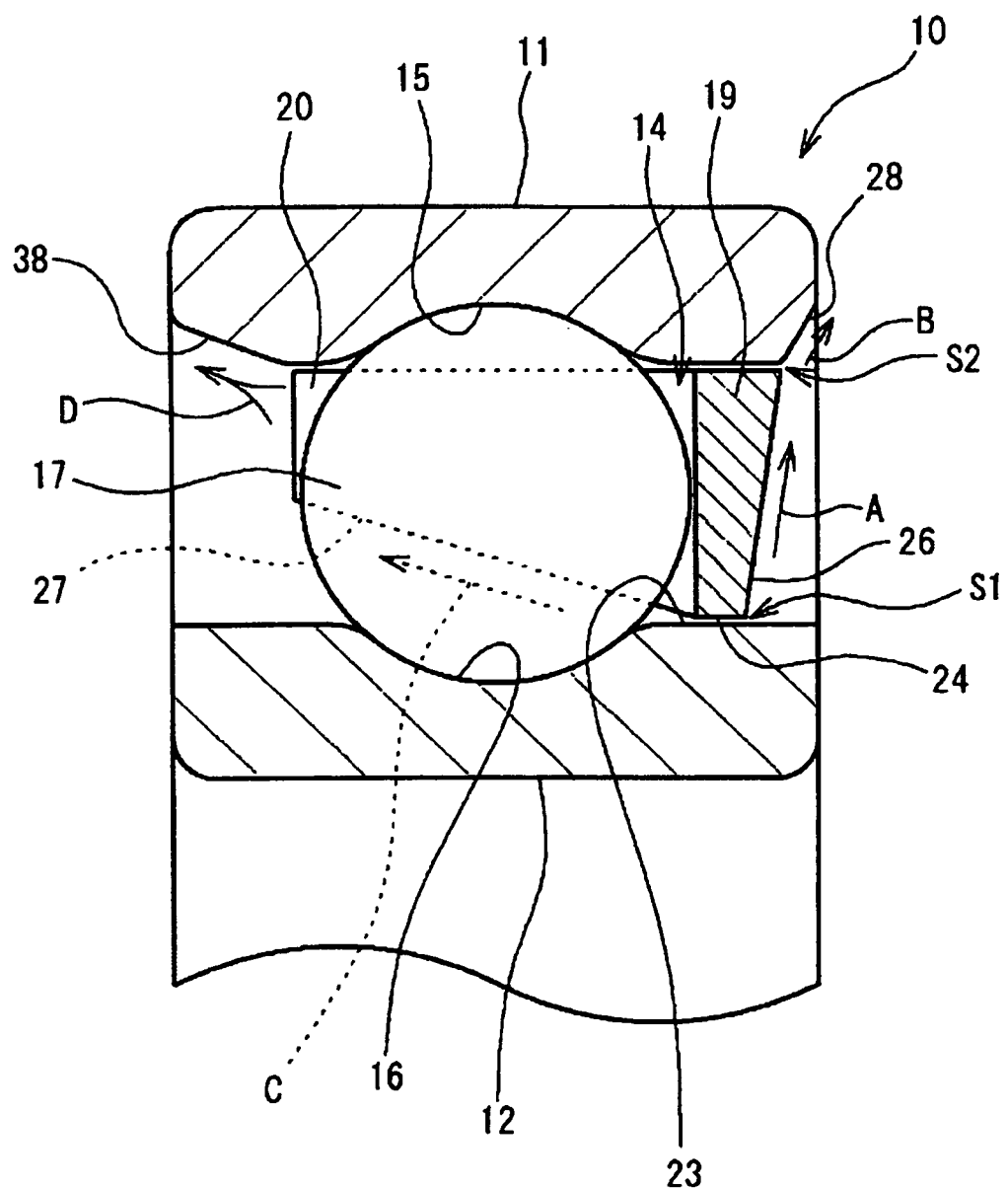
FIG. 8 is a sectional diagram of a rolling bearing according to the seventh embodiment of the invention.

FIG. 8 is a sectional diagram showing a rolling bearing according to the seventh embodiment of the invention. According to this embodiment, the left end portion of the inner peripheral surface of an outer ring 11 is configured to form an inclined surface 38 which gradually inclines closer to the outside in the radial direction toward the left side from the right side. Due to the inclined surface 38, the discharge of the lubricant flown into the rolling bearing 10 can be promoted (see an arrow D).

The invention is not limited to the above-mentioned embodiments and may be suitably changed in the design. For example, although the explanation is made as to the cage 14 of the inner-ring guide type for each of the above-mentioned embodiments, the cage 14 may be the outer-ring guide type or a rolling-element guide type. In the case of the former type, the guide gap S1 is formed between the outer ring 11 and the cage 14 and also the seal gap S2 is formed between the inner ring 12 and the cage 14. In the case of the latter type, the seal gap S2 is formed between the outer ring 11 and the cage 14 and also between the inner ring 12 and the cage 14.

The rolling bearing according to the invention can be used suitably as the rolling bearing used under the condition of oil bath lubrication within an axle case or a transmission case etc. but not limited to such the uses.

Figure 15:
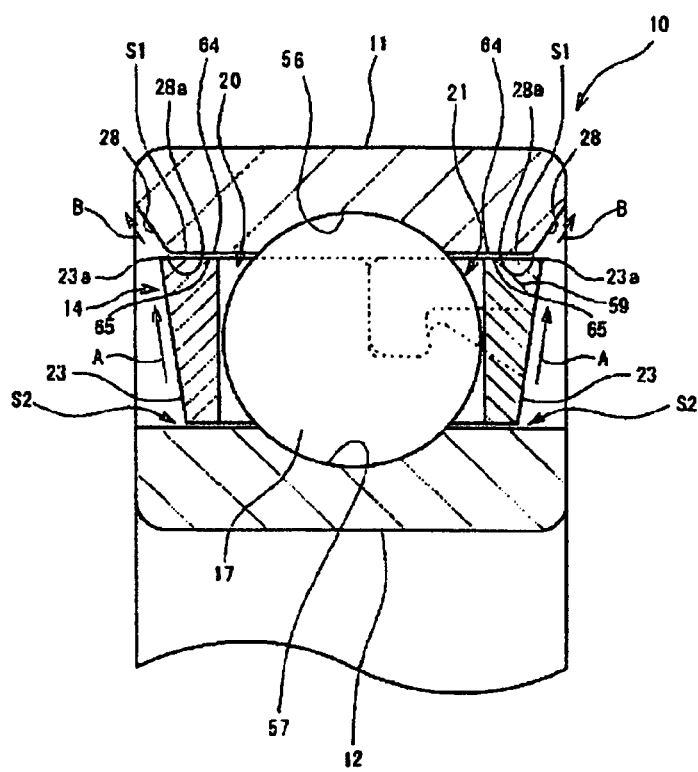
FIG. 15 is a sectional diagram of a rolling bearing according to the eighth embodiment of the invention.

FIG. 15 is a sectional diagram showing a rolling bearing according to the eighth embodiment of the invention. A rolling bearing 10 is a deep groove ball bearing which includes an outer ring 11, an inner ring 12, a plurality of balls (rolling elements) 17 and a cage 14. The outer ring 11 and the inner ring 12 are disposed concentrically. An outer-ring raceway surface 56 of a concave curved shape is formed at the inner peripheral surface of the outer ring 11 and an inner-ring raceway surface 57 of a concave curved shape is formed at the outer peripheral surface of the inner ring 12. A plurality of balls 17 are disposed so as to be rotatable between the outer-ring raceway surface 56 and the inner-ring raceway surface 57. Each of the outer ring 11, the inner ring 12 and the balls 17 is formed by metal such as bearing steel, and the cage 5 is formed by composite resin.

Figure 16:
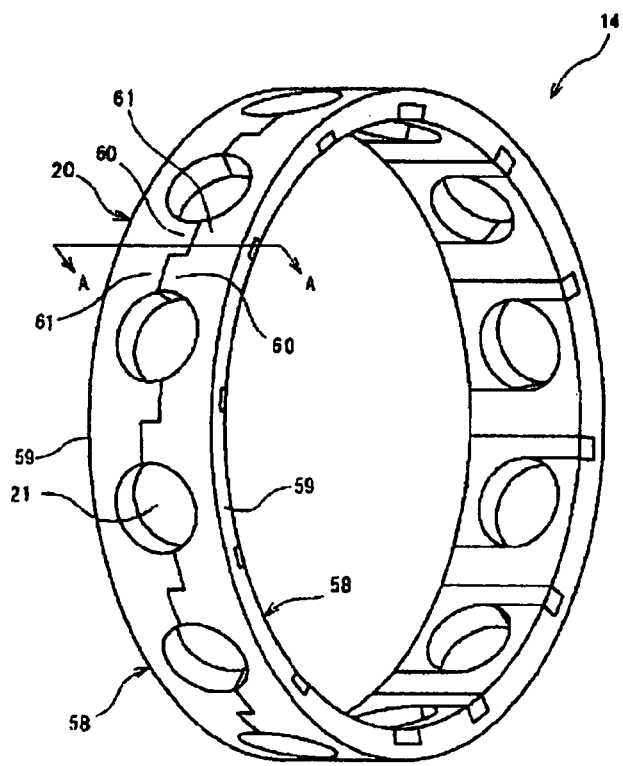
FIG. 16 is a perspective view of a cage used for the rolling bearing shown in FIG. 15

FIG. 16 is a perspective view showing the cage 14 used for the rolling bearing. The cage 14 is a so-called a combination type which is formed by coupling a pair of divided members 58 divided in the axial direction. Each of the divided members 58 includes an annular portion 59 (first annular portion and a second annular portion), long pillar portions 60 protruding on the one side in the axial direction and short pillar portions 61. The long pillar portion 60 and the short pillar portion 61 are formed in an adjacent manner along the circumferential direction. The long pillar portion 60 and the short pillar portion 61 disposed in adjacent to each other are set as a pair, and a plurality of the pairs are formed along the entire circumferential surface of the annular portion 59 with a predetermined interval.

Figure 17:
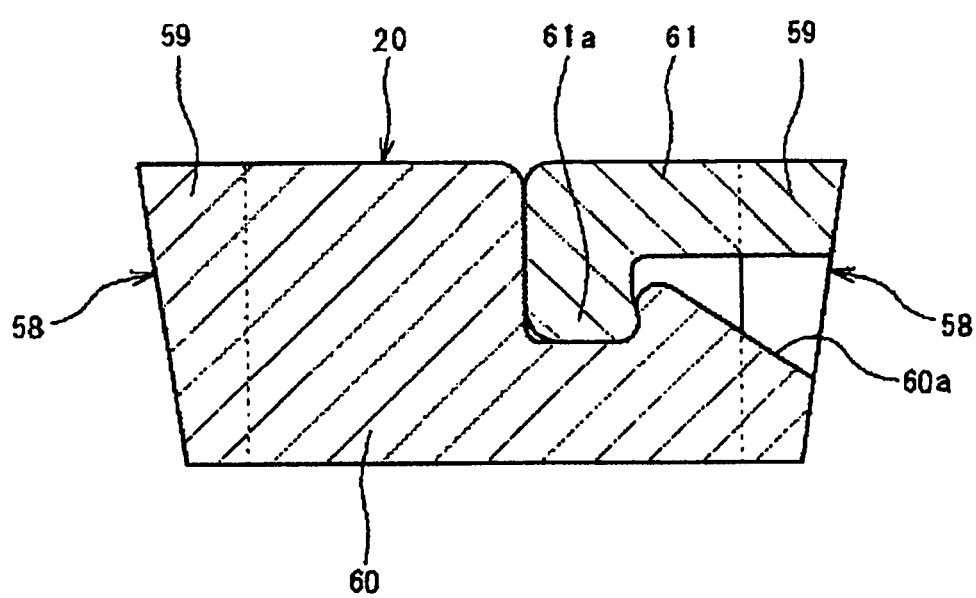
FIG. 17 is a sectional diagram along A-A in FIG. 16.

FIG. 17 is a sectional diagram along a line A-A in FIG. 16 showing the coupling structure of the divided members 58. A nail portion 60a is integrally formed at the free end in the axial direction of the long pillar portion 60. An engagement portion 61a is integrally formed at the free end in the axial direction of the short pillar portion 61. The engagement portion 61a of the short pillar portion 61 protruding from the one of the divided members 58 engages with the nail portion 60a of the long pillar portion 60 protruding from the other of the divided members 58, whereby the both divided members 8 are coupled in the axial direction. Since the long pillar portion 60 and the short pillar portion 61 of the one of the divided members 58 disposed in adjacent are engaged with the short pillar portion 61 and the long pillar portion 60 of the other of the divided members 58 disposed in adjacent, respectively, a pillar potion 20 is configured so as to be bridged between the annular portions 59 of the both divided members 58. A pocket 21 for housing the ball 17 is formed between the pillar portions 20 disposed in adjacent to each other along the circumferential direction. The pocket 21 is formed so as to surround more than the half of the entire circumferential periphery of the ball 17.

The cage 14 is formed as a so-called outer-ring guide type, wherein a guide surface 64 for guiding the rotation of the cage 14 is formed at the inner peripheral surface of the outer ring 11, guided surfaces 65 are formed at the outer peripheral surfaces of the annular portions 59 of the respective divided members 58 constituting the cage 14, and fine guide gaps S1 are formed between the guide surface 64 and the guided surfaces 65. The cage 14 is configured in a manner that the rotation thereof is guided by the outer ring 11 due to the mutual contact of the guide surface 64 and the guided surfaces 65 via the lubricant. The size of the guide gap S1 is set to be about 0.15 mm (radius value), for example.

Seal gaps S2 are formed between the inner peripheral surfaces of the annular portions 59 of the respective divided members 58 and the both end portions in the axial direction of the outer peripheral surface of the inner ring 12, respectively. The seal gap S2 is larger than the guide gap S1. However, the seal gap is a labyrinth gap which can restrict the flowing of excessive lubricant into spaces between the inner peripheral surfaces of the respective annular portions 59 and the both end portions in the axial direction of the outer peripheral surface of the inner ring 12. The size of the seal gap is set to be in a range from about 0.35 to 0.45 (radius value), for example, and preferably about 0.4 mm (radius value).

Each of the outer side surfaces in the axial direction of the annular portions 59 of the respective divided members 58 is formed as an inclined surface 16 which gradually inclines closer to the outside in the axial direction toward the radial outside direction. Due to the inclined surface 16, the size (thickness) in the axial direction at the outer end portion in the radial direction of the annular portion 19 is larger than the size in the axial direction at the inner end portion in the radial direction thereof.

Each of the both end portions in the axial direction of the inner peripheral surface of the outer ring 11 is formed as an inclined surface 28 which gradually inclines closer to the outside in the axial direction toward the radial outside direction. The radial outer end portion 16a of the inclined surface 16 of the annular portion 59 is formed so as to locate on the outside in the axial direction with respect to the radial inner end portion 28a of the inclined surface 28.

According to the rolling bearing 10 configured in the above-mentioned manner, in the case of using the outer ring 11 as a fixed ring and the inner ring 12 as a rolling ring under the condition of oil bath lubrication, when the cage 14 rotates together with the inner ring 12, excessive lubricant tends to flow into the rolling bearing 10 from the gaps S1, S2 between the annular portions 59 and the inner ring 12, the outer ring 11. However, according to the rolling bearing 10 of this embodiment, since the gap between the outer ring 11 and the annular portion 59 is formed as the guide gap S1, the flow of the lubricant through the guide gap S1 is restricted. Also, since the gap between the inner ring 12 and the annular portion 59 is formed as the seal gap S2, the flow of the lubricant through the seal gap S2 is restricted. Thus, since the flowing of the excessive lubricant into the rolling bearing 10 through the respective gaps S1, S2 can be prevented, the rolling loss of the rolling element 17 within the rolling bearing 10 can be reduced. As a result, the increase of the bearing torque due to the rolling loss can be suppressed.

Further, due to the inclined surface 16 of the cage 14, since the excessive lubricant existing near the inclined surface 16 is introduced toward the outside in the axial direction while flowing toward the outside in the radial direction (see arrows A in FIG. 15) due to the centrifugal force caused by the rotation of the cage 14, the flowing of the excessive lubricant into the rolling bearing 10 from the guide gap S1 between the outer ring 11 and the annular portion 59 can be effectively suppressed. Further, due to the inclined surface 28 of the outer ring 11, since the lubricant can be further introduced toward the radial outside direction and toward the outside in the axial direction (see arrows B in FIG. 15), the flowing of the excessive lubricant into the rolling bearing 10 from the guide gap S1 can be further effectively suppressed. In this case, since the radial outer end portion 16a of the inclined surface 16 locates on the outside in the axial direction with respect to the radial inner end portion 28a of the inclined surface 28, the lubricant is introduced toward the radial outside direction and toward the outside in the axial direction via the inclined surface 28 on the outside in the axial direction from the radial inner end portion 28a when the lubricant moves to the inclined surface 28 from the inclined surface 16. Thus, the flowing of the excessive lubricant into the rolling bearing 1 from the guide gap S1 can be furthermore effectively suppressed.

Since the annular portion 59 of the cage 14 is formed in a manner that the size (thickness) in the axial direction of the radial outer end portion thereof is larger than that of the radial inner end portion thereof, the guide gap S1 between the outer ring 11 and the annular portion 59 can be made long in the axial direction, whereby the sealing property can be further enhanced.

The invention can be implemented in a suitably modified manner without being limited to the above-mentioned embodiment. For example, although the embodiment is explained as to the outer-ring guide type cage 14, the cage 14 may be the inner-ring guide type or the rolling-element guide type. In the case of the former type, the guide gap S1 is formed between the inner ring 12 and the cage 14 and also the seal gap S2 is formed between the outer ring 11 and the cage 14. In the case of the latter type, the seal gap S2 is formed between the inner ring 3 and the cage 14 and also between the outer ring 11 and the cage 14.

Although the above-mentioned embodiment is explained as to the deep groove ball bearing, an angular contact ball bearing may be employed instead thereof. In this case, a machined or drilled type cage which is formed integrally is employed instead of the combination type cage formed by divided members, as the cage 14.

Further, the rolling bearing 10 according to the invention can be used suitably as the rolling bearing used under the condition of oil bath lubrication within an axle case or a transmission case etc. but not limited to such the uses.

(Inspection of Optimum Shape of Cage)

The inventors of the present application inspected the optimum shape of the cage by the experimentations as to the following three aspects with respect to the rolling bearing (in particular, the rolling bearing having the structure shown in FIG. 1) according to the invention.

(1) Guide type of the cage (inner-ring guide type or outer-ring guide type)

(2) Angle of the rear surface of the cage (angle $\alpha$ of the inclined surface 26 in FIG. 2)

(3) Size of the guide gap

The evaluation is made base on an amount of flow per unit time (penetrating oil amount) of the lubricant flowing to the left side (pillar portion 20 side) via the gaps S1, S2 between the annular portion 19 and the inner ring 12, the outer ring 11 from the right side (annular portion 19 side) of the rolling bearing in FIG. 1. When the penetrating oil amount becomes large, the oil agitation loss within the rolling bearing increases and hence the loss of the bearing torque becomes large. Thus, the determination was made that the shape of the cage is more suitable as the penetrating oil amount becomes smaller.

Figure 9:
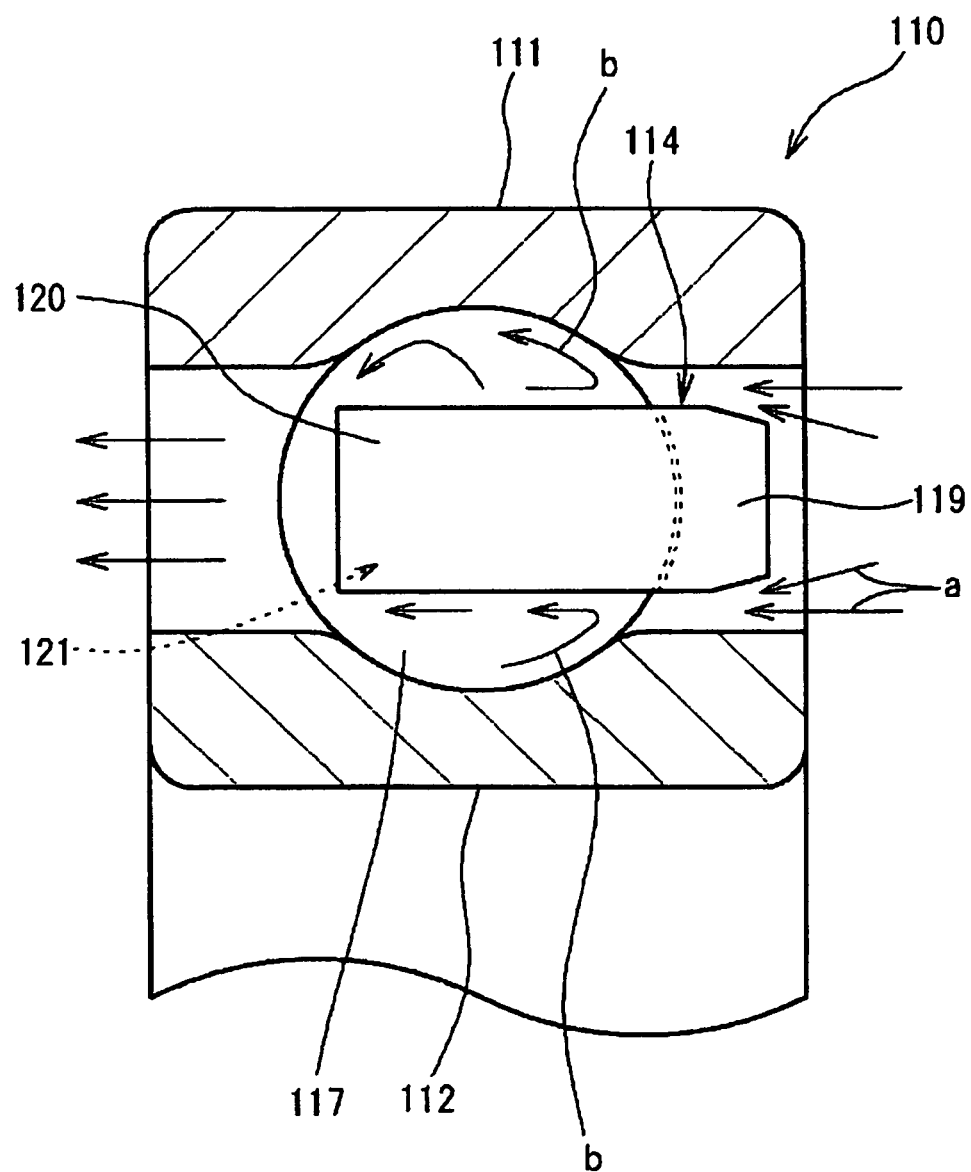
FIG. 9 is a sectional diagram of a rolling bearing according to the related art.
Figure 10:
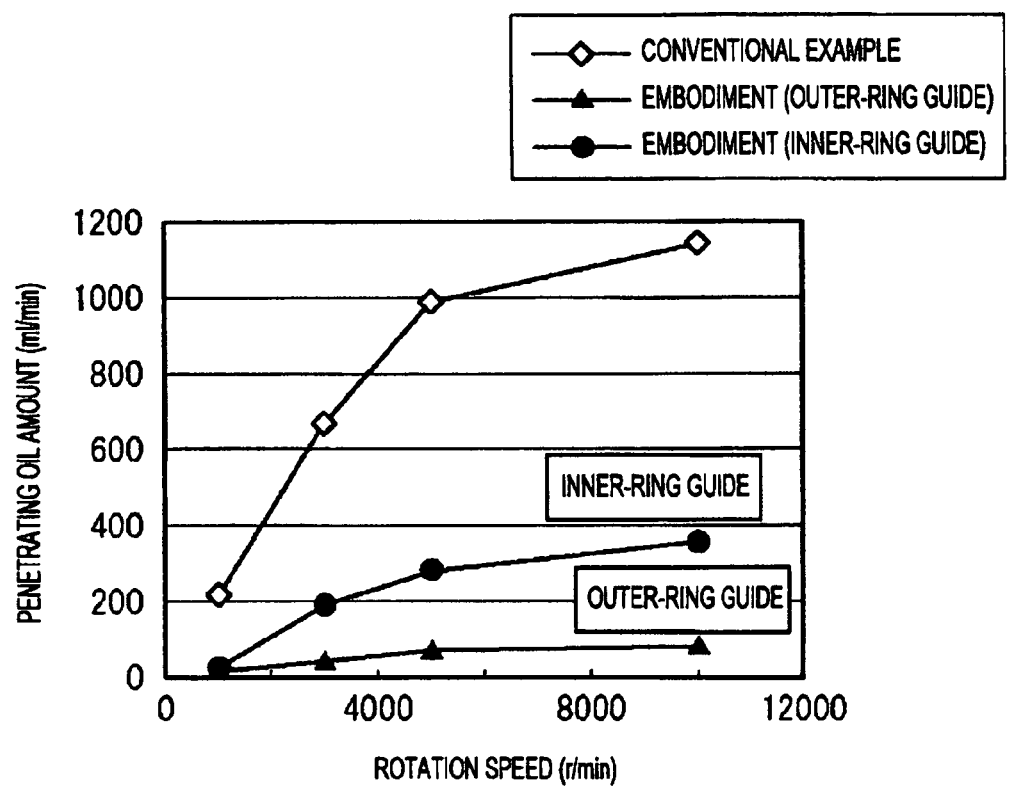
FIG. 10 is a graph showing relations between the rotation speed of the rolling bearing and a penetrating oil amount of the lubricant in the case where the guide type of the cage is set to be an inner-ring guide type and an outer-ring guide type.

FIG. 10 is a graph showing relations between the rotation speed of the rolling bearing (embodiment) and the penetrating oil amount in the case where the guide type of the cage is set to be the inner-ring guide type and the outer-ring guide type. In this graph, a conventional example shows the relation between the rotation speed and the penetrating oil amount in the case of using the rolling bearing of the ball guide type shown in FIG. 9. As clear from this graph, when compared between the embodiment and the conventional example, the penetrating oil amount of the embodiment was smaller than that of the conventional example irrespective of the rotation speed of the rolling bearing. Thus, in the case of the embodiment, it will be understood that the oil agitation loss of the lubricant within the rolling bearing becomes small and so the reduction effects of the torque loss is enhanced. Further, in the embodiment, when the inner-ring guide type and the outer-ring guide type are compared, the penetrating oil amount of the outer-ring guide type was smaller than that of the inner-ring guide type. Thus, it is more preferable to employ the rolling bearing using the outer-ring guide type in order to reduce the torque loss.

Figure 11:
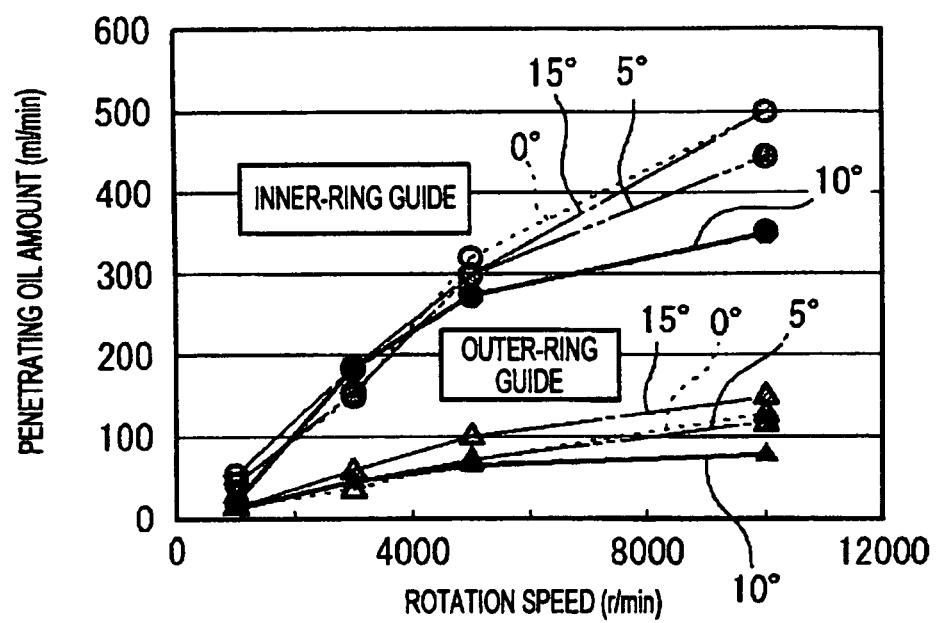
FIG. 11 is a graph showing relations between the rotation speed of the rolling bearing and the penetrating oil amount of the lubricant in the case where the angle of the rear surface of the cage is changed.

FIG. 11 is a graph showing relations between the rotation speed of the rolling bearing and the penetrating oil amount in the case where the angle of the rear surface of the cage is changed. In this experimentation, the penetrating oil amount was measured in each of the cases where the angle (angle with respect to the vertical surface) $\alpha$ of the rear surface of the annular portion 19 of the cage 14 was changed in four steps (0 degrees, 5 degrees, 10 degrees and 15 degrees), with respect to each of the inner-ring guide type and the outer-ring guide type.

According to this graph, it will be understood that the penetrating oil amount of the outer-ring guide type was smaller irrespective of the rotation speed as compared with the case where the inner-ring guide type was employed as the guide type. Further, the penetrating oil amount became minimum when the angle α of the rear surface was set to 10 degrees in each of the guide types. Thus, it will be understood that it is most suitable to set the angle α of the rear surface of the cage 14 to 10 degrees among the four angles of 0 degrees, 5 degrees, 10 degrees and 15 degrees.

When the investigation is made as to other angles α=0 degrees, 5 degrees and 15 degrees, it will be understood that there are not large differences in the penetrating oil amount thereamong and the effects of reducing the penetrating oil amount is small in each of cases where the rear surface angle α is too small and too large. In this respect, it is considered that when the rear surface angle α is small, since the degree of action for guiding the lubricant toward the right direction (outside in the axial direction) due to the inclined surface 26 becomes small, the inflow amount of the lubricant from the gap between the outer ring 11 and the annular portion 19 of the cage 14 increases. In contrast, it is considered that when the rear surface angle α is large, since the width in the axial direction of the annular portion 19 opposing to the outer peripheral surface of the inner ring 12 becomes small necessarily, the inflow amount of the lubricant from the gap between the inner ring 12 and the annular portion 19 of the cage 14 increases.

Figure 12:
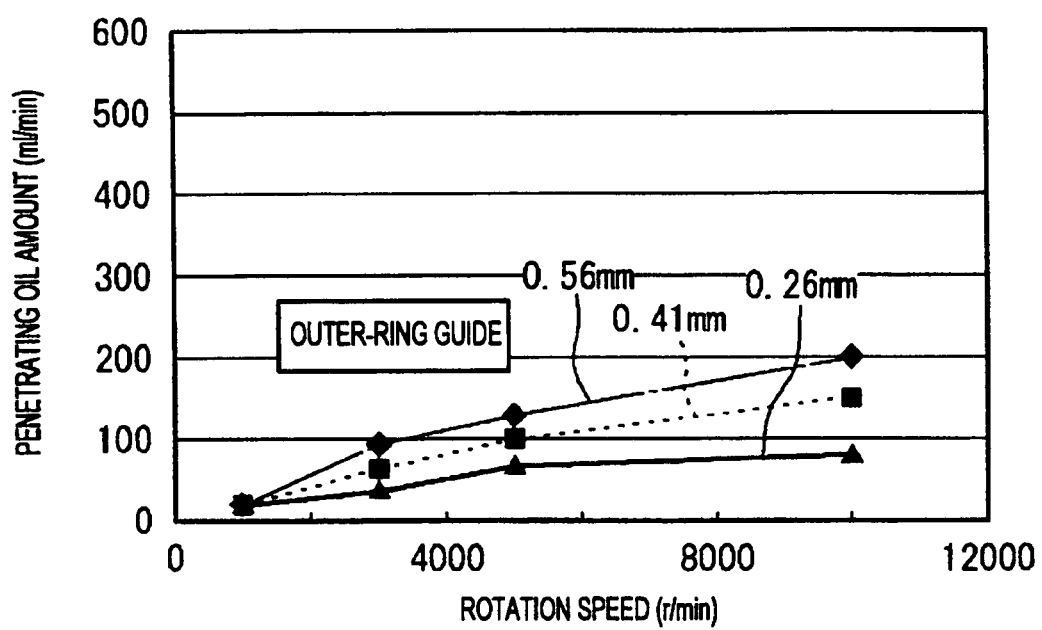
FIG. 12 is a graph showing relations between the rotation speed of the rolling bearing and the penetrating oil amount of the lubricant in the case where a guide gap is changed.

FIG. 12 is a graph showing relations between the rotation speed of the rolling bearing and the penetrating oil amount in the case where the guide gap is changed. In this experimentation, the outer-ring guide type was employed as to which the good experimental results was obtained in the experimentations shown in FIGS. 10 and 11, and the guide gap was changed in three steps of 0.26 mm, 0.41 mm and 0.56 mm in its diameter value.

As clear from the graph of FIG. 12, the penetrating oil amount becomes smaller as the size of the guide gap becomes smaller. Since the outer diameter of the cage 14 becomes large when expanded by the heat applied thereto, the guide gap is preferably to have the minimum size capable of being suitably made in contact slidably with the outer ring 11 even when the cage 14 is thermally expanded. According to this experimentation, it will be preferable to set the guide gap (diameter value) in a range from about 0.26 mm to about 0.36 mm by taking such the thermal expansion into consideration.

Figure 13:
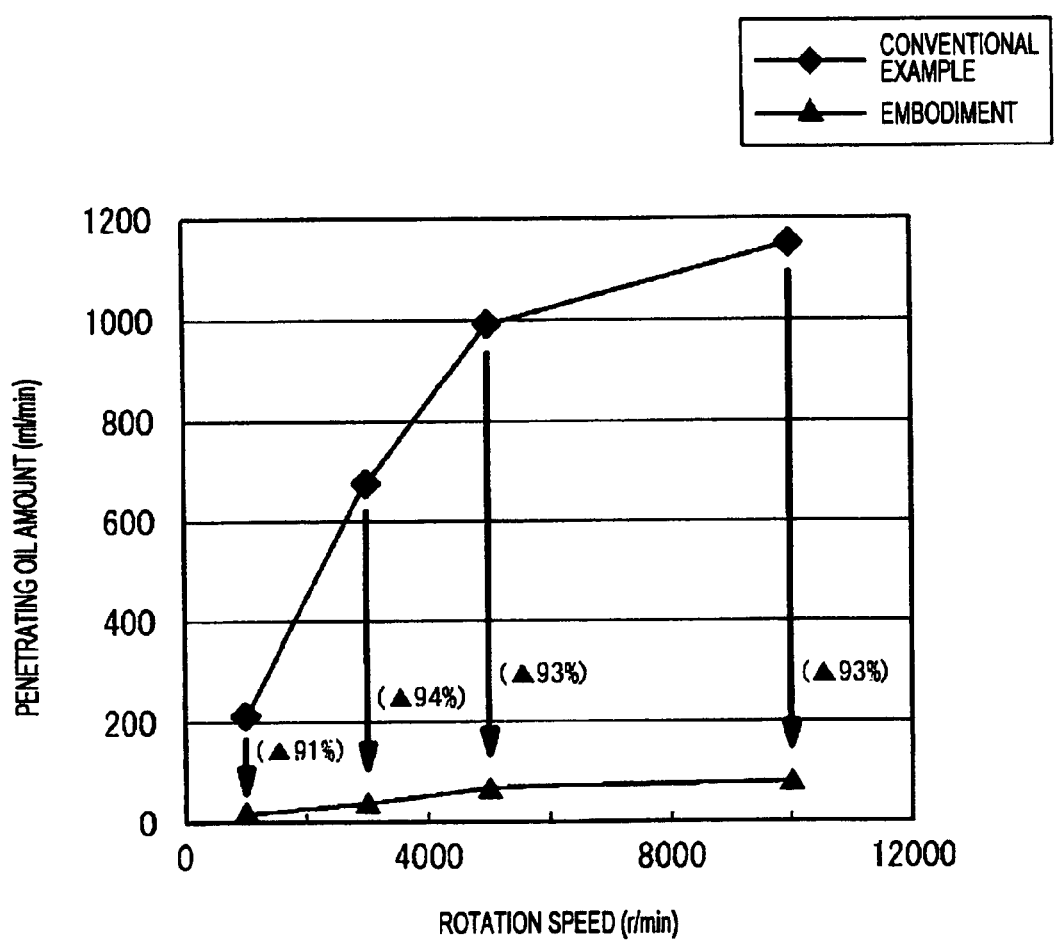
FIG. 13 is a graph showing relations between the rotation speed of the rolling bearing and the penetrating oil amount of the lubricant in the case of the rolling bearing of the embodiment and that of a conventional example.

Based on the respective results obtained by the above-mentioned experimentations, it is considered to be more suitable that the rear surface angle a of the cage 14 is set to 10 degree and the guide gap is set to 0.26 mm (diameter value). FIG. 13 shows the relation between the rotation speed of the rolling bearing and the penetrating oil amount in the case of the rolling bearing (embodiment) having the cage 14 of this configuration and the rolling bearing (conventional example) shown in FIG. 9. As clear from the graph of FIG. 13, the penetrating oil amount of the rolling bearing according to the embodiment is quite small regardless of the rotation speed as compared with the rolling bearing of the conventional example. To be concrete, it will be understood that the penetrating oil amount of the embodiment is about one tenth of that of the conventional example.

Figure 14:
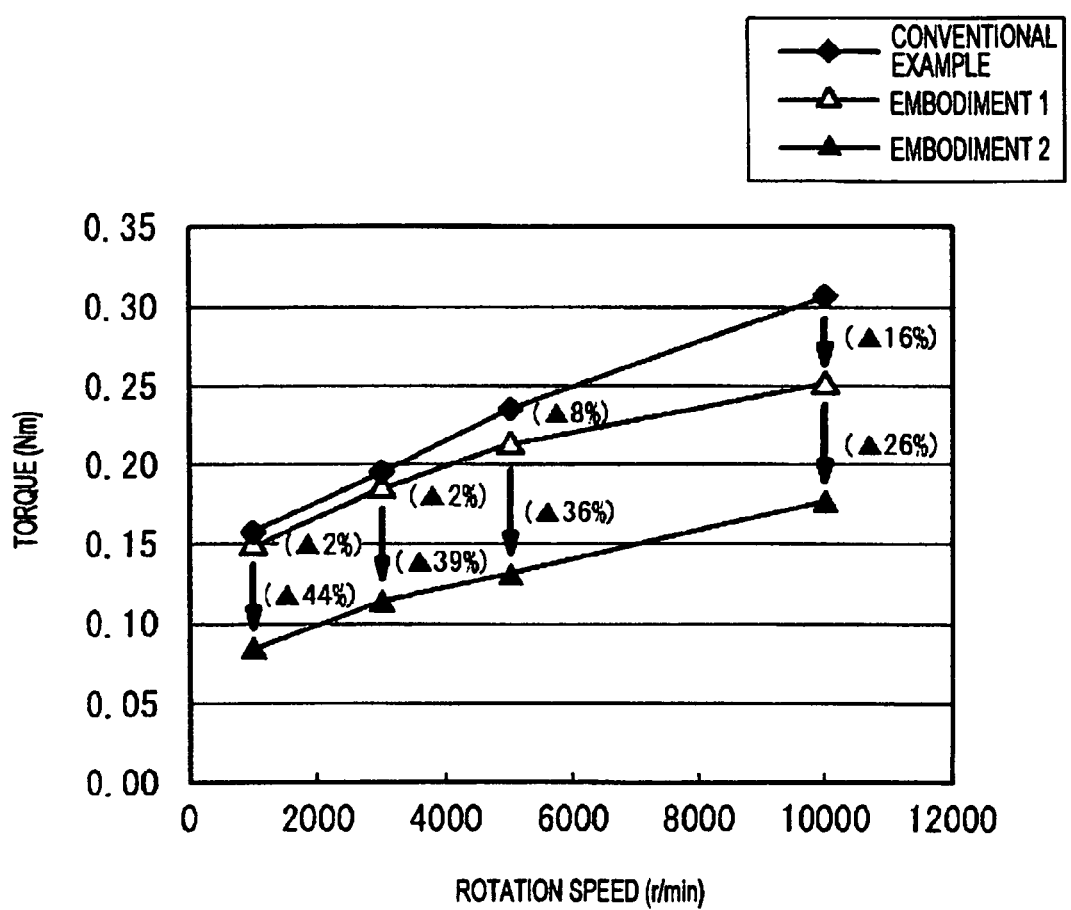
FIG. 14 is a graph showing relations between the rotation speed of the rolling bearing and the bearing torque in the case of the embodiment and the conventional example.

Next, the relation between the rotation speed of the rolling bearing and the bearing torque was measured by the experimentation as to each of the above-mentioned embodiment (represented as embodiment 1 in FIG. 14) and the conventional example. The measurement result is shown in FIG. 14. As clear from FIG. 14, the torque of the embodiment 1 is reduced irrespective of the rotation speed as compared with the conventional example. In particular, the torque reduction is remarkable as the rotation speed increases. That is, the torque was reduced by about 16% at the rotation speed of about 10000 r/min.

In FIG. 14, the embodiment 2 is a case where the inner specification of the rolling bearing was changed with respect to the embodiment 1. To be concrete, the surface roughness of the outer-ring raceway surface and the inner-ring raceway surface of the embodiment 1 was set to 0.032 μm, whilst the surface roughness of the outer-ring raceway surface and the inner-ring raceway surface of the embodiment 2 was set to be half thereof, that is, 0.016 μm. Further, the curvature of the inner-ring raceway surface of the embodiment 1 was set to be 50.5%, whilst the curvature of the inner-ring raceway surface of the embodiment 2 was increased to 53.0%.

When the comparison is made between the embodiment 1 and the embodiment 2, the torque of the embodiment 2 is further reduced irrespective of the rotation speed as compared with the embodiment 1. Thus, it will be understood that the torque can be reduced also by suitably changing the inner specification of the rolling bearing. Further, when the comparison is made between the conventional example and the embodiment 2, the torque of the embodiment 2 is further reduced as compared with the conventional example. Therefore, it will be understood that, in order to reduce the bearing torque, it is quite effective to optimize the shape of the cage 14 and also to optimize the inner specification of the rolling bearing.

The invention claimed is:

1. A rolling bearing comprising:
   an outer ring;
   an inner ring;
   a plurality of rolling elements rotatably provided between the outer ring and the inner ring; and
   a cage which holds the plurality of rolling elements with a predetermined interval in a circumferential direction thereof and of which rotation is guided by the outer ring, the inner ring or the rolling elements,
   wherein the cage comprises a first annular portion which is disposed at an end portion thereof in an axial direction, and a plurality of pillar portions which protrude in the axial direction toward the rolling elements from an inside surface, facing the rolling elements in the axial direction, of the first annular portion and which are arranged in the circumferential direction thereof so as to form pockets defined between the pillar portions and configured to house the rolling elements, respectively,
   wherein a seal gap configured so as to restrict a flowing of lubricant is formed between the first annular portion and one of or both the outer ring and the inner ring which do not guide the cage,
   wherein an inclined outside surface is disposed on an opposite side of said first annular portion from said inside surface in an axial direction, said inclined outside surface inclines axially away from the pillar portions as the inclined outside surface extends radially outward opposite from the rolling elements in the axial direction, and
   wherein the inclined outside surface extends from a radially innermost portion of the cage to a radially outermost portion of the cage.

2. The rolling bearing according to claim 1,
   wherein an inner peripheral surface at an end portion of the outer ring in the axial direction is formed to have an inclined surface which inclines axially away from the pillar portions as the inclined surface extends radially outward in the axial direction toward an end of the outer ring.

3. The rolling bearing according to claim 2, wherein an inner peripheral surface of the pillar portion is formed to have an inclined surface which inclines away from the inner ring in a radial direction, and toward the outer ring as the pillar portion extends in the axial direction from the inside surface of the first annular portion to an end of the pillar portion.

4. The rolling bearing according to claim 2, wherein one of the outer ring and the inner ring guides the cage.

5. The rolling bearing according to claim 2, wherein the outer ring guides the cage.

6. The rolling bearing according to claim 1, wherein an inner peripheral surface of the pillar portion is formed to have an inclined surface which inclines away from the inner ring in a radial direction, and toward the outer ring as the pillar portion extends in the axial direction from the inside surface of the first annular portion to an end of the pillar portion.

7. The rolling bearing according to claim 6, wherein one of the outer ring and the inner ring guides the cage.

8. The rolling bearing according to claim 6, wherein the outer ring guides the cage.

9. The rolling bearing according to claim 6, wherein the inner peripheral surface of the pillar portion extends axially past the rolling element.

10. The rolling bearing according to claim 1, wherein one of the outer ring and the inner ring guides the cage.

11. The rolling bearing according to claim 1, wherein the outer ring guides the cage.

12. The rolling bearing according to claim 1, wherein the cage further comprises a second annular portion which is disposed at an end portion thereof on an opposite side to the first annular portion in the axial direction, and wherein the plurality of pillar portions are formed so as to bridge between the first annular portion and the second annular portion.

13. The rolling bearing according to claim 12, wherein said second annular portion includes an axially outer inclined surface, said axially outer inclined surface inclines axially away from the pillar portions as the axially outer inclined surface extends radially outward opposite from the rolling elements in the axial direction, and wherein the axially outer inclined surface extends from a radially innermost portion of the cage to a radially outermost portion of the cage.

14. The rolling bearing according to claim 1, wherein the outer ring guides the cage.

15. The rolling bearing according to claim 1 further comprising:
a guide gap formed between the first annular portion and one of the outer or inner rings for guiding the cage, wherein a size of the guide gap is less than a size of the seal gap;
wherein an incline angle of the inclined outside surface of the first annular portion is between zero and fifteen degrees.

16. A rolling bearing comprising:
an outer ring;
an inner ring;
a plurality of rolling elements rotatably provided between the outer ring and the inner ring; and
a cage which holds the plurality of rolling elements with a predetermined interval in a circumferential direction thereof and of which rotation is guided by the outer ring, the inner ring or the rolling elements,
wherein the cage comprising a first annular portion which is disposed at an end portion thereof in an axial direction, and a plurality of pillar portions which protrude in the axial direction toward the rolling elements from an inside surface, toward the rolling elements in the axial direction, of the first annular portion and which are arranged in the circumferential direction thereof so as to form pockets defined between the pillar portions and configured to house the rolling elements, respectively,
a seal gap configured so as to restrict a flowing of lubricant formed between the first annular portion and the outer ring,
a guide gap configured so as to guide the cage formed between the first annular portion and the inner ring,
wherein an inclined outside surface is disposed on an opposite side of said first annular portion from said inside surface in an axial direction, said inclined outside surface inclines axially away from the pillar portions as the inclined outside surface extends radially outward opposite from the rolling elements in the axial direction, and
wherein the inclined outside surface extends from a radially innermost portion of the cage to a radially outermost portion of the cage.

17. The rolling bearing according to claim 16, wherein an inner peripheral surface of the pillar portion is formed to have an inclined surface which inclines away from the inner ring in a radial direction, and toward the outer ring as the pillar portion extends in the axial direction from the inside surface of the first annular portion to an end of the pillar portion, and wherein the inner peripheral surface of the pillar portion extends axially past the rolling element.

* * * * *